J. W. WATSON.
SHOCK ABSORBER.
APPLICATION FILED JUNE 11, 1914.
1,230,352.
Patented June 19, 1917.
2 SHEETS—SHEET 2.
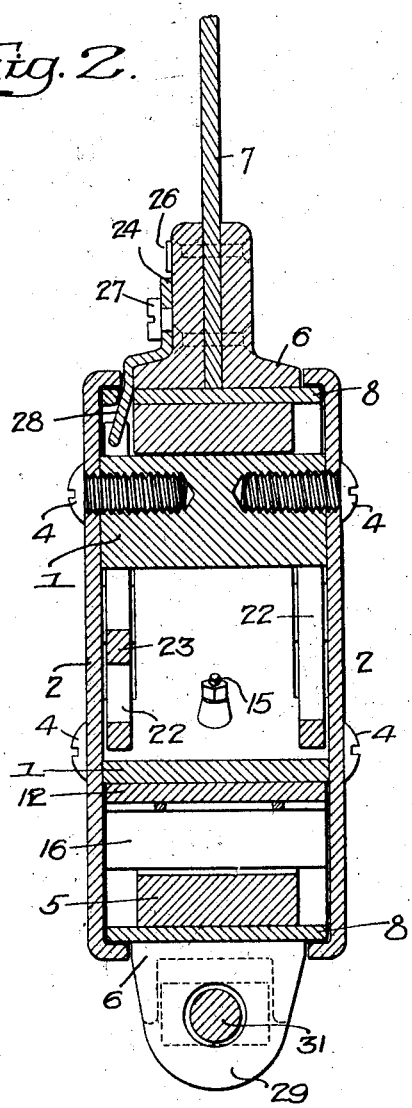
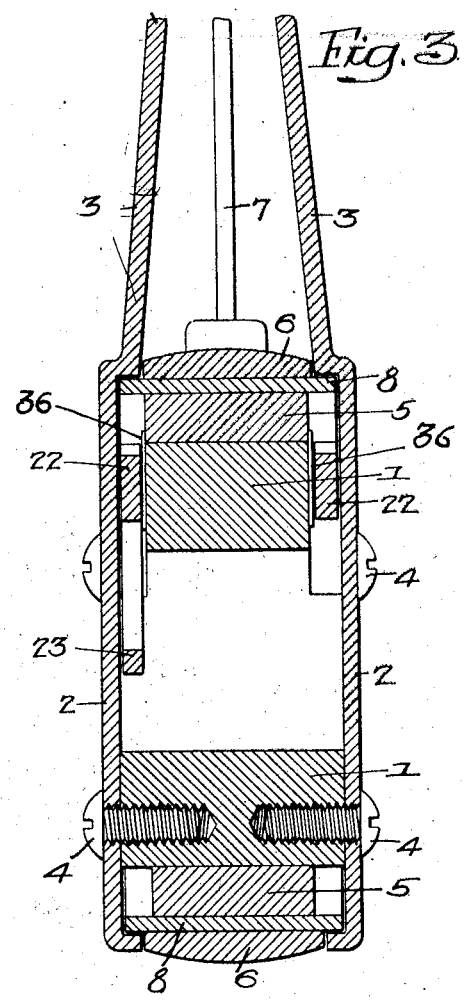
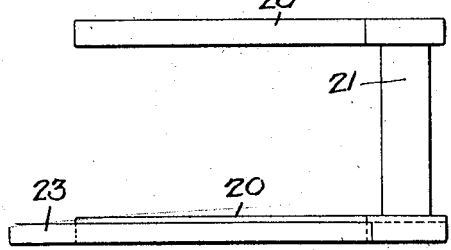
Witnesses.
Charles H. York.
Wills A. Simonds.
Inventor.—
John W. Watson.
by his Attorneys.—
Howson & Howson

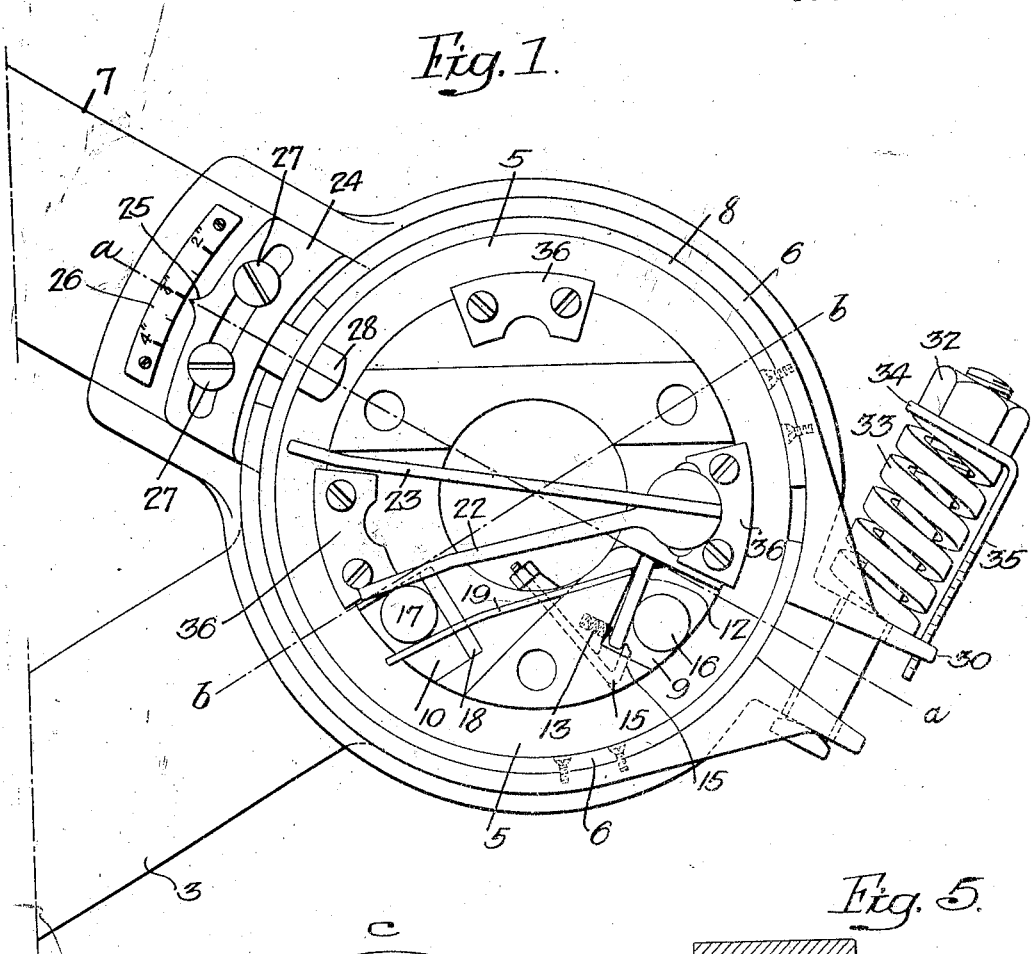
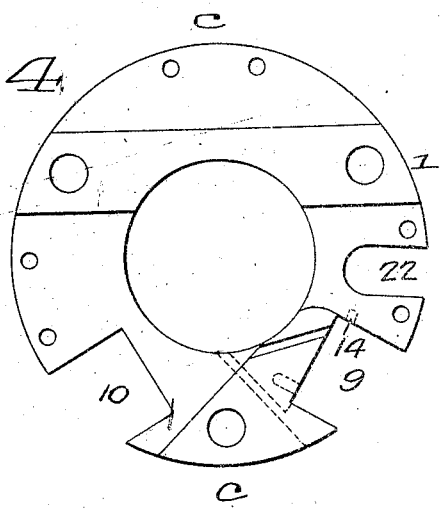
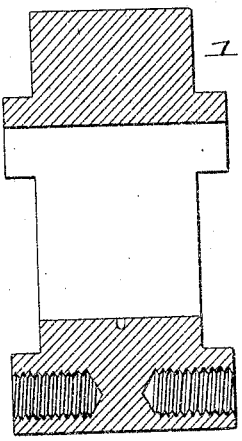

UNITED STATES PATENT OFFICE.

JOHN W. WATSON, OF WAYNE, PENNSYLVANIA.

SHOCK-ABSORBER.

1,230,352.

Specification of Letters Patent.

Patented June 19, 1917.

Application filed June 11, 1914. Serial No. 844,538.

*To all whom it may concern:*

Be it known that I, JOHN W. WATSON, a citizen of the United States, residing in Wayne, Delaware county, Pennsylvania, have invented an Improved Shock-Absorber, of which the following is a specification.

One object of my invention is to provide a simple, inexpensive, and substantial device particularly designed for connection between the axle or spring and the frame or body of a motor or other vehicle, which shall automatically act to retard movement of said parts toward each other only after a definite and predetermined amount of unretarded movement has occurred, while it shall also act to check or retard movement of the parts away from each other for all or the greater part of such movement.

It is also desired to provide a novel form of shock absorber which, in addition to the above features, shall include means for conveniently adjusting the distance through which its arms are free to move before the retarding force is applied, the invention also including a device for visually indicating the relative positions of the parts of the adjusting mechanism.

The invention further contemplates a shock absorber so made as to permit of its being readily taken apart for inspection or adjustment, the construction including a combination of parts whereby an indication is given of the amount of wear of one of the friction members.

Another object of the invention is to provide a shock absorber of the type above described with a device for giving visual indication of the adjustment and consequent retarding force operative to prevent excessive movements of the parts of the vehicle to which it is connected, the construction being such as to permit of the parts being brought with certainty to a predetermined adjustment when the device is being assembled after its elements have been taken apart, or after wear has taken place.

These objects and other advantageous ends I secure as hereinafter set forth, reference being had to the accompanying drawings, in which, Figure 1 is a side elevation of a shock absorber constructed according to my invention, one of the side plates and its arm being removed;

Figs. 2 and 3 are sections on the lines $a$—$a$ and $b$—$b$ Fig. 1;

Fig. 4 is a side elevation of the central core of the device;

Fig. 5 is a section on the line $c$—$c$ Fig. 4; and,

Fig. 6 is an elevation of the device for actuating one of the clutch rollers.

In the above drawings, 1 represents an annular casting, usually of iron, to whose opposite faces are attached two circular flanged plates 2 whose diameter is somewhat larger than that of said casting. Each of these plates or disks has formed integral with or otherwise connected to it an arm 3 and these two arms are parallel. For attaching these disks to the core I preferably employ screws 4 but obviously other means may be used if desired.

Concentric with the core 1 is a ring 5, which under certain conditions may be gripped to it as hereafter described. Surrounding this ring is a third ring 6 having rigidly connected to it an arm 7, which in turn is attached to one of the parts, as the body, of a motor vehicle, while the two arms 3 are connected to the axle thereof in the well-known manner. Between the rings 5 and 6 and in the present instance immovably connected to the latter, is mounted an annular lining of some friction material, such as wood, leather, or fiber.

As shown in Fig. 4, the core 1 has two relatively deep peripheral cavities 9 and 10, each of which, in the present instance, has two parallel sides and a bottom at right angles thereto. Mounted within the bottom part of the cavity 9 is a flat plate 12 extending the full width of the same and normally pressed outwardly by a spring 13, so that while one end is loosely held adjacent the bottom of the cavity by having projections which enter recesses 14 in the side thereof, its opposite end is normally maintained at a greater or less distance from the bottom of the cavity, depending upon the adjustment of a hooked screw 15. This latter extends from the hollow interior of the core through the body of the same so that its hooked end extends over and engages the spring pressed end of the plate 12, the opposite end of said bolt being threaded for the reception of a nut whereby the plate may be drawn toward the bottom of the cavity 9 or allowed to move away from the same under the action of the spring 13, as will be seen from Fig. 1. The open face of the cavity 9 is closed by the adjacent portion of the ring 5 and in this chamber is mounted a roller 16 forming part of a clutch, the parts being so designed that while one end of said cavity is of a width less than the diameter of the roller 16, the width of its opposite end is greater than the roller diameter.

In the second cavity 10 is mounted a clutch roller 17 while the bottom of this cavity is preferably provided with a bearing plate 18, and the arrangement is such that the diameter of the roller is greater than the width of one side of the cavity but less than the width of the other. As before, the ring 5 forms that wall of the cavity which is opposite the bearing plate 18.

A pair of spring strips 19 carried in grooves of the core 1 normally bear on the opposite ends of the roller 17 so as to tend to maintain it in the wide portion of the cavity 10 but at its opposite side said roller is engaged by a pair of parallel arms 22 forming part of or connected by a spindle 21 rotatably mounted in a third peripheral recess of the core 1. Also projecting from this spindle at one end thereof is a spring strip 23 whose length is such that it projects over one edge of the ring 5 but like all of the parts so far described is within the casing formed by the side plates 2 and the outer ring 6. At the point where this latter is joined by the arm 7, I adjustably mount on it or on said arm a plate 24 having an indicating pointer 25 extending adjacent a scale 26, and provide said plate with a slot for the reception of a pair of screws 27 whereby it may be readily clamped to the arm 7 or the ring 6, as the case may be. Projecting radially inward from this indicating plate 24 is an arm 28 whose length is such that it may be engaged by the projecting spring strip 23, carried by the spindle 21, under certain conditions of operation. The ring 6 is split and its two ends are extended radially as indicated at 29 and 30 in Fig. 1 so as to be connected by a bolt 31, which has an adjustable nut 32 confining a coiled spring 33 between itself and said end 30. Obviously the friction existing between the lining 8 of the ring 6 and the ring 5 is dependent upon the extent to which the nut 32 is screwed up and the force exerted by the spring 33 to draw together the ends 29 and 30. A plate 34 of sheet metal is preferably placed on the bolt 31 between the spring 33 and the nut 32, and has an arm 35 bent at right-angles to its plane so as to extend through a suitable opening in the end 30, there being graduations on this arm as shown in Fig. 1. The ring 5 is normally maintained in a position midway between the two plates 2 and 3 by flange pieces 36 held by screws to the core 1 so as to project over it.

Under conditions of operation, if the arm 7 be connected to the body of a motor vehicle and the arms 3 to the axle or to some structure attached thereto, it is obvious that if said body and axle move apart a short distance the angle between the arms 3 and 7 will be increased. As a consequence, while the roller 17 remains inactive, the roller 16 will be moved by the ring 5 toward the inner end of the cavity 9 and if this angular movement of the arms be less than a predetermined amount the plate 12 will merely be moved toward the bottom of said cavity against the action of its spring 13 without the occurrence of any retardation to the arm movement. If, however, this angular movement be more than the predetermined amount, the roller 16 will tend to move toward the narrow end of its cavity after the plate 12 has been seated upon the bottom thereof, with the result that it jams between the inner wall of the ring 5 and said plate 12, rigidly clutching together said ring and the core 1. As a consequence, any further angular movement of the arm 7 away from the arms 3 is retarded to an extent dependent upon the friction between the lining 8 of the ring 6 and the outer surface of the ring 5, which force is in turn dependent upon the compression of the spring 33 as determined by the adjustment of the nut 32. The movement of the arms 7 and 3 in the opposite direction at once causes the roller 16 to be moved away from the narrow part of the cavity 9, so that no retardation of such movement is caused through the agency of this roller.

It will be understood that by slacking off the nut on the hook bolt 15 the plate 12 may be so adjusted as to cause a greater delay before the retardation of the movement of arms 3 and 7 occurs, though if desired this hook bolt may be omitted as well as the spring 13 so that the retarding force is exerted as soon as the arms begin to separate.

As the arms 3 and 7 begin their movement together as above noted, the core 1 and the ring 5 are in no way connected, since the spring 19 holds the second roller 17 in the wide part of its cavity 10. This movement, however, if continued far enough, causes the spring strip 23 to come into engagement with the end of the arm 28, which, being fixed by its screws 27 to the arm 7, acts through this strip to turn the spindle 21. The arms 22 are, therefore, caused to move the roller 17 against the action of the springs 19 from the wide part of the cavity 10 toward its narrow part until finally said roller jams between the bottom plate 18 and the ring 5, clutching said ring to the core. Further movement of the arms 7 and 3 toward each other is therefore, retarded by reason of the frictional connection between the rings 5 and 6 so that the movement of the members to which said arms are attached is materially reduced or dampened to an extent depending among other things on the amount of compression given the spring 33 and hence to the force drawing together the ends 29 and 30 of the ring 6. Obviously the time elapsing between the beginning of the movement together of the arms 3 and 7 and the time at which the retardation to said movement is effected, will depend upon the adjustment of the plate 24, since its position determines the time of engagement of its arm 28 with the spindle spring strip 23. By slacking the screws 27 and moving the plate 24 concentrically with the core and rings, the arm 28 may be so adjusted as to cause the arms 3 and 7 to be frictionally connected sooner or later after their relative movement begins.

Visual indication of the amount of movement through which friction is exerted before the ends of the arms 3 and 7 come together is given by the pointer 25 and the scale plate 26, and this latter is preferably graduated in inches and fractions thereof. As shown in Fig. 1 the plate 24 and hence its arm 28 are in such positions that the ends of the arms 3 and 7 have a retarded movement toward each other of three inches before they engage or strike.

When the arms 3 and 7, after having moved toward each other, begin to separate, the arm 28 continues to be engaged by the spring strip 23, which was flexed as said arms moved together, until finally said strip returns to its natural position and is disengaged, thus permitting the springs 19 to move the roller 17 away from the narrow end of its cavity. At the same time, the roller 16 begins to move toward the narrow end of the cavity 9 and after said arms 3 and 7 have moved apart a definite distance (or as soon as they begin to move apart, if the plate 12 is held down to the bottom of said cavity) this roller clutches together the core 1 and the ring 5, thus causing movement to occur between the core and the rings 5 and 6 and bringing the retarding force of the device into action.

In originally adjusting my invention to suit it to a motor vehicle or other apparatus the relative movement of whose parts is to be checked or retarded, the nut 32 is set up so as to compress the spring 33 to the extent necessary to cause the desired amount of friction between the brake ring 8 and the ring 5 to properly check the separating movement of the vehicle body and axle. As a result of this operation, the indicator arm 35 moves through the end 30 of the ring 6 and occupies a definite position when the parts are finally adjusted. Having thus fixed the intensity of the retarding force for controlling the moving apart of the body and axle, the desired checking of the movement together of these parts is obtained by adjusting the plate 24 to cause the arm 28 to strike the spring strip 23 at that point which will cause frictional retardation to be exerted only for sufficient time to prevent the striking of said body and axle under heavy road shocks.

If wear of the band 8 has occurred after the device has been in use for some time, this would be indicated by an outward movement of the graduated arm 35 relatively to the end 30, and the parts may be returned to their predetermined adjustment by screwing up the nut 32 until said arm occupies the position originally given it relatively to the end 30.

With the above described apparatus it is possible to support the body of a motor vehicle on relatively resilient, easy riding springs, which as long as said vehicle is traveling on good roads, maintain said body at the proper position relative to the axles, etc. Under these conditions the ordinary relative movements of the body and axles do not bring the shock absorber into action when said parts approach each other, since the arms 3 and 7 are free to move toward each other to the limited extent resulting from ordinary operation without causing the core 1 and ring 5 to be clutched together. When, however, the vehicle is run on relatively rough roads or is subjected to heavy shocks, the use of the light springs is still permissible, since the excessive movement of the arms 3 and 7 toward each other would be checked after the parts have moved together to within the predetermined distance of each other fixed by the adjustment of the plate 24. Likewise, the separation of the body and axle would be retarded at once or after these parts had moved a definite distance apart, depending on the adjustment of the bolt 15, so that at all times the vehicle would ride easily without being subjected to jars or shocks on slightly uneven roads as well as on very rough roads.

From the above it will be noted that when the springs of the vehicle are compressed, such action is free or unimpeded for a certain distance and is then retarded for the remainder of their movement together as shown on the indicator 24, while the expansion of the springs is at all times retarded or is retarded after the parts have separated but a relatively short distance.

I claim:—

1. The combination in a shock absorber of two relatively rotatable members for attachment to the parts whose motion is to be retarded; a device for opposing the rotation of said members; and an independent element operative to delay the action of said device until one of the members has moved to within a predetermined distance of the other.

2. The combination in a shock absorber of two relatively movable members for attachment to the parts whose motion is to be retarded; a device for interposing a frictional resistance to the movement of said members either toward or from each other; and an independent element operative to delay the action of said device when the members move together until one of the parts is within a predetermined distance of the other.

3. The combination in a shock absorber of two relatively rotatable members for attachment to the parts whose motion is to be retarded; a device for opposing the relative rotation of one of said members in one direction; and an independent element operative to delay the action of said device when said rotation occurs in the opposite direction until one of said members has moved to within a predetermined distance of the other.

4. The combination in a shock absorber of two relatively movable members for attachment to the parts whose motion is to be retarded; means for opposing movement of said members in either direction; two independent devices for causing operation of said means when the members move toward or from each other respectively; and an independent element operative to delay the action of one of said devices until one of the members has moved freely to within a predetermined distance of the other.

5. The combination in a shock absorber of two relatively movable members for attachment to the parts whose motion is to be retarded; means for opposing a frictional resistance to the movement of said members in either direction; two independent devices for respectively causing operation of said means; and independent elements for delaying the action of said devices until one of the parts has moved to within a predetermined distance of the other.

6. The combination in a shock absorber of two arms; a cylindrical structure connected to one of the arms; a ring frictionally connected to the other arm; a roller for clutching together said structure and ring; with means for causing the action of said roller to connect said structure and ring after the latter has moved through a predetermined angle relatively to the structure.

7. The combination in a shock absorber of two arms; a cylindrical structure connected to one arm; a ring frictionally connected to the other arm; two clutch devices for respectively connecting the cylindrical structure to the ring when relative movement of said parts occurs in either direction; and a device for preventing the action of one of said clutching devices until a predetermined free movement has occurred between the ring and the cylindrical structure.

8. The combination in a shock absorber of two relatively rotatable members for connection to the parts whose motion is to be retarded; a core attached to one of said members; a ring frictionally connected to the other member; a rolling clutch member operative between the ring and the core for connecting said parts when they are moved in one direction; and means for preventing action of said clutch member until the rotatable members have moved to within a predetermined distance of each other.

9. The combination in a shock absorber of two relatively movable members for connection to the parts whose motion is to be retarded; a core connected to one of the members; a ring connected to the other member, one of the members comprised by the ring and the core being frictionally connected to its arm; a roller for clutching together the ring and the core when said parts move relatively in one direction; with a member operative on the roller and actuated by one of the arms after it has moved relatively to the other arm through a predetermined distance, for causing the roller to clutch together the ring and the core.

10. The combination in a shock absorber of two frictionally connected parts; a third part; and two independent devices for operatively connecting said third part to one of said two frictionally connected parts, one of said devices being adjusted to be operative during movement of said third part in one direction and the other device being adjustable and set to be operative to connect said parts for any desired portion of its movement in the opposite direction.

11. The combination in a shock absorber of two frictionally connected parts; a third part; means for connecting said third part to one of said frictionally connected parts; a device for causing operation of said means during the greater portion of the movement of the third part in one direction; and a second device for causing the same parts to be connected for any desired portion of the movement of the third part in the opposite direction.

12. The combination in a shock absorber of two relatively movable members for connection to the parts whose motion is to be retarded, one of said members including a portion frictionally connected to the remainder; a clutching member mounted to connect the second member to said frictionally attached portion of the other when they move relatively to each other in one direction; means normally holding the clutching member in an inoperative position; an arm for moving said member against said means to cause the frictionally connected portion to be clutched to the second movable member; and an adjustable structure mounted to cause movement of the arm after the movable members have approached to within a predetermined distance of each other.

13. The combination in a shock absorber of two relatively movable members for connection to the parts whose motion is to be retarded, one of said members including a portion frictionally connected to the remainder; a clutching member mounted to connect the second member to said frictionally attached portion of the other when they move relatively to each other in one direction; means normally holding the clutching member in an inoperative position; an arm for moving said member against said means to cause the frictionally connected portion to be clutched to the second movable member; and an adjustable structure mounted to cause movement of the arm after the movable members have approached to within a predetermined distance of each other; with means for indicating the distance for which the movable members will be clutched together before they engage each other.

14. The combination in a shock absorber of two main arms; a ring frictionally connected to one of the arms; a core attached to the other arm; a clutch member for connecting the core and the ring when the arms move together; means normally holding the clutch member from operation; means including a spring arm for causing the clutch member to operate; with a projection on one of the main arms mounted to engage the spring arm to operate the clutch member when said main arms have moved together a predetermined distance.

15. The combination in a shock absorber of two main arms; a ring frictionally attached to one arm; a core attached to the other arm; a rolling clutch member carried by the core; an arm for forcing said member into position to couple the core and the ring; a spring connected to said latter arm; and an abutment mounted on one of the main arms in position to engage the spring after said arms have moved to within a predetermined distance of each other.

16. The combination in a shock absorber of two main arms; a ring frictionally attached to one arm; a core attached to the other arm; a rolling clutch member carried by the core; an arm for forcing said clutch member into position to couple the core and the ring; a spring connected to said latter arm; and an abutment mounted on one of the main arms in position to engage the spring after said arms have moved to within a predetermined distance of each other; with independent means for clutching together the core and the ring when the main arms move apart.

17. The combination in a shock absorber of two arms for connection to the parts whose movement is to be retarded; a structure frictionally connected to one of the arms; a clutch for automatically connecting said structure to the other arm when said arms are moved together; a second clutch for automatically connecting said structure and the other arm when the arms are moved apart; and means operative on the first clutch for delaying its action until the arms have approached to within a predetermined distance of each other.

18. The combination in a shock absorber of two arms for connection to the parts whose movement is to be retarded; a structure frictionally connected to one of the arms; a clutch for automatically connecting said structure to the other arm when said arms are moved together; a second clutch for automatically connecting said structure and the other arm when the arms are moved apart; means operative on the first clutch for delaying its action until the arms have approached to within a predetermined distance of each other; with means operative on the second clutch for delaying its action until the arms have moved a predetermined distance apart.

19. The combination in a shock absorber of two arms; a ring; means for causing friction between said ring and one of the arms; a core connected to the other arm; two oppositely working roller clutch members for connecting the core to the ring; means for holding one of the clutch members from operation; a spring arm operative on said latter member for throwing it into action; and an abutment mounted on one of the arms in position to engage the spring to cause operation of said clutch member after the arms have moved to within a predetermined distance of each other.

20. The combination in a shock absorber of two arms; a ring; means for causing friction between said ring and one of the arms; a core connected to the other arm; two oppositely working roller clutch members for connecting the core to the ring; means for holding one of the clutch members from operation; a spring arm operative on said latter member for throwing it into action; and an adjustable abutment for actuating the spring arm under operative conditions.

21. The combination in a shock absorber of two main arms; a ring frictionally connected to one of the arms; a core connected to the other arm and having two oppositely tapering recesses; rollers mounted respectively in each of said recesses for clutching together the core and said ring; a spring operative on one of the rollers to normally maintain it in the wide part of its recess; an oscillatory arm operative on said roller; a second spring connected to said arm; and an abutment mounted on the main arm to which the ring is connected, in position to cause said second spring to move said roller into the narrow part of its recess under predetermined conditions.

22. The combination in a shock absorber of two main arms; a ring frictionally connected to one of the arms; a core connected to the other arm and having two oppositely tapering recesses; rollers mounted respectively in each of said recesses for clutching together the core and the ring; a spring operative on one of the rollers to normally maintain it in the wide part of its recess; an oscillatory arm operative on said roller; a second spring connected to said arm; an abutment mounted on the main arm to which the ring is connected, in position to cause said second spring to move said roller into the narrow part of its recess; with means for delaying the clutching action of the other roller.

In testimony whereof, I have signed my name to this specification, in the presence of two subscribing witnesses.

JOHN W. WATSON.

Witnesses:
WILLIAM E. BRADLEY,
WM. A. BARR.